United States Patent
Ohshima et al.

[11] Patent Number: 6,119,310
[45] Date of Patent: Sep. 19, 2000

[54] HINGE UNIT

[75] Inventors: Kazuyoshi Ohshima; Katsuya Imai, both of Tokyo, Japan

[73] Assignee: Sugatsune Industrial Co., Ltd., Tokyo, Japan

[21] Appl. No.: 09/148,901

[22] Filed: Sep. 8, 1998

[30] Foreign Application Priority Data

Feb. 9, 1998 [JP] Japan .................................. 10-042830

[51] Int. Cl.$^7$ .................................................. E05C 17/64
[52] U.S. Cl. .............................................. 16/342; 16/336
[58] Field of Search ............................ 16/342, 341, 296, 16/327, 328, 336, 337, 352, 353, 329, 330

[56] References Cited

U.S. PATENT DOCUMENTS

| | | | |
|---|---|---|---|
| 2,622,922 | 12/1952 | Schroeder | 16/342 |
| 5,052,078 | 10/1991 | Hosoi | 16/342 |
| 5,715,575 | 2/1998 | Kubota | 16/342 |

FOREIGN PATENT DOCUMENTS 8-121462  5/1996  Japan .

*Primary Examiner*—Chuck Y. Mah
*Attorney, Agent, or Firm*—Jacobson, Price, Holman & Stern, PLLC

[57] ABSTRACT

A hinge unit can suitably be used for a portable electronic apparatus such as a portable telephone set comprising a main body and a swing member to be secured to the main body by means of hinges such that the swing member may be folded on the main body for the convenience of storage when not in use and opened from the main body by a desired angle and held to the open position for use. The hinge unit has a simple configuration and hence is compact and lightweight and manufactured at low cost. With each hinge of the hinge unit, a cam shaft 14 is pushed into a spring 13 rigidly secured to the main body 1 along an edge thereof such that the cam shaft 14 becomes axially unreleaseable along axial direction X1. The cam shaft 14 has a protruding section 14g to be fitted into one of the knuckle-shaped end 11b of the swing member 11. As the cam shaft 14 is pushed along axial direction X2, the resilient tips 13a, 13a of the spring 13 ride over the tapered section 14d of the cam shaft 14 and, once the pressure for pushing the cam shaft 14 is released, the protruding section 14 is moved back to the normal position by the resilient force of the resilient tips 13a, 13a, where the cam shaft 14 is turned with the bearing section 11c of the knuckle-shaped end 11b. The resilient tips 13a, 13a pinch the tip-holding areas 14f, 14f of the cam section 14a to hold the swing member 11 in the open position so that the hinge unit does not require the use of two spring members as in the case of comparable known hinge unit.

2 Claims, 12 Drawing Sheets

FIG. 9A (PRIOR ART)
FIG. 9B (PRIOR ART)
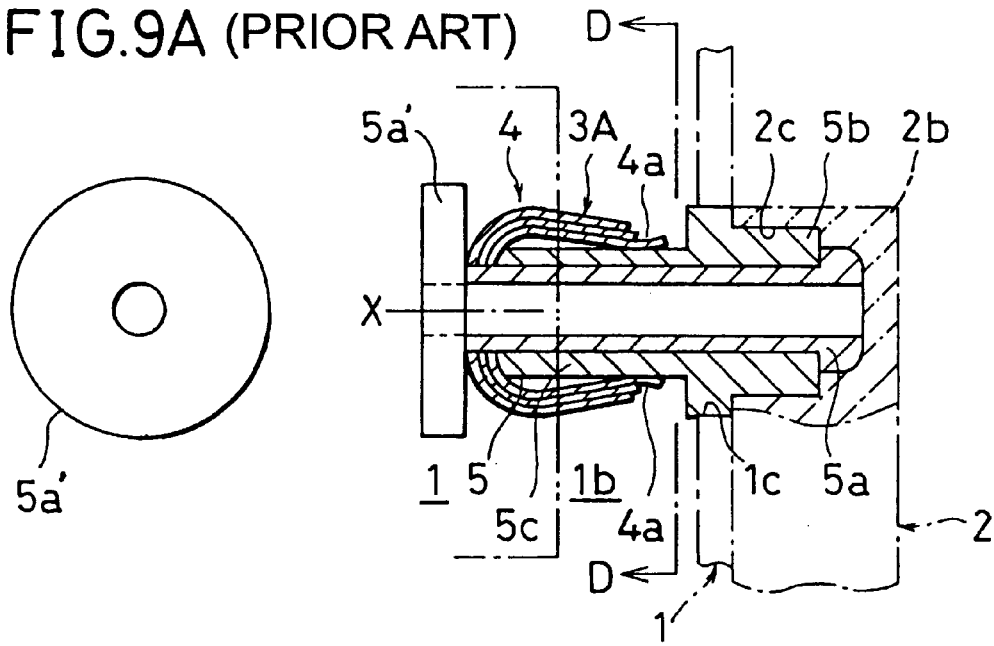
FIG. 9C (PRIOR ART)     FIG. 9D (PRIOR ART)
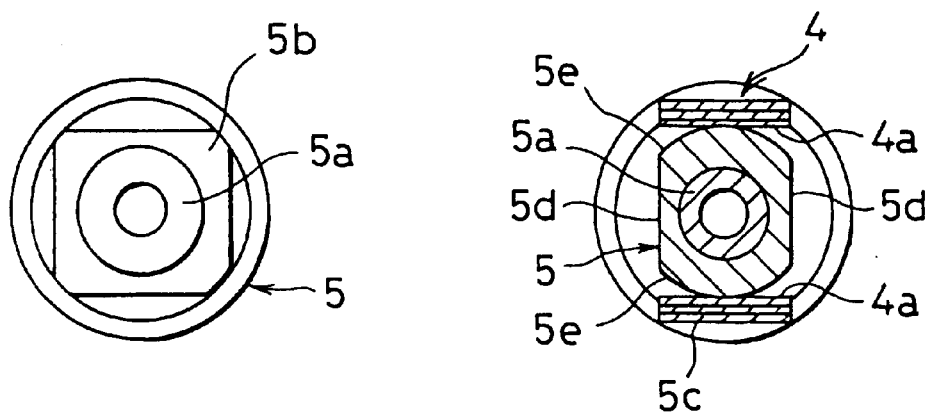

FIG.11A (PRIOR ART)
FIG.11B (PRIOR ART)
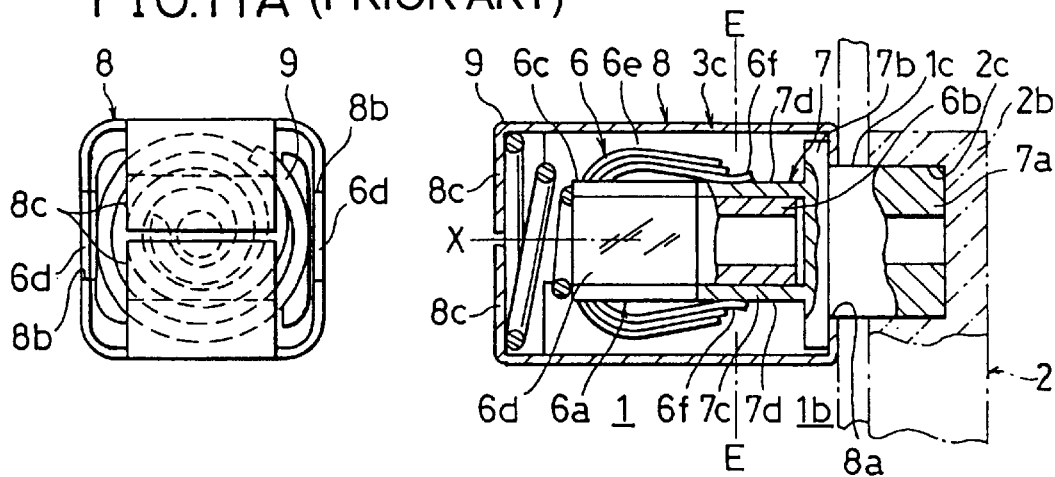
FIG.11C (PRIOR ART)
FIG.11D (PRIOR ART)
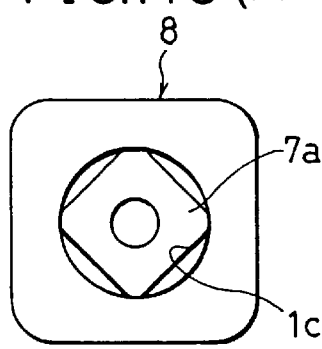
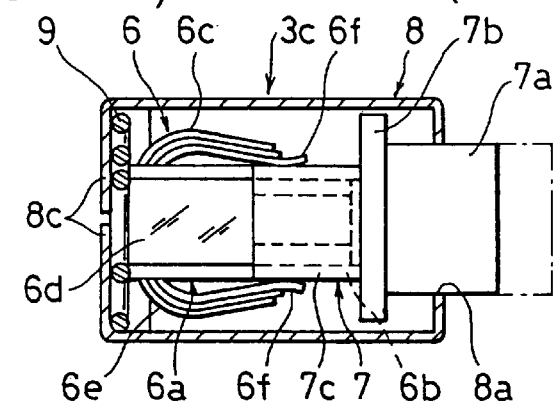
FIG.11E (PRIOR ART)
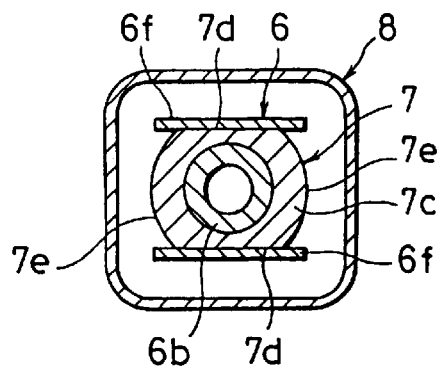

HINGE UNIT

BACKGROUND OF THE INVENTION

1. Field of the Invention

This invention relates to a hinge unit to be suitably used for a portable electronic apparatus such as a portable telephone set, a portable computer or an electronic note book that comprises a main body and a swing member typically containing a microphone and secured to the main body by means of hinges such that the swing member may be folded on the main body for the convenience of storage when not in use and opened from the main body by a desired angle and held to the open position for use.

2. Prior Art

FIGS. 12A and 12B of the accompanying drawings schematically illustrate a known portable telephone set comprising a main body 1 and a swing member 2 linked to each other at an edge 1a of the main body 1 and the corresponding edge 2a of the swing member 2 by means of the paired hinges 3A, 3B of a hinge unit that connect the opposite ends 1b, 1b of the edge 1a to the corresponding knuckle-shaped opposite ends 2b, 2b of the edge 2a respectively.

With this arrangement, the swing member 2 can be folded on the main body 1 as indicated by solid lines in FIG. 12B for the convenience of storage and transportation and then be opened along the phantom lines to an operating position P so that the user can talk to the microphone arranged in the swing member 2 while he or she is holding the main body with a single hand (Japanese Patent Application Laid-Open No. 8-121462).

FIGS. 8A through 9C schematically illustrate the paired hinges 3A, 3B of the known hinge unit used in a portable telephone set. FIG. 8A is a partial plan view and FIG. 8B is a partial lateral view of the portable telephone set.

Each of the hinges 3A, 3B comprises a spring 4 and a cam shaft 5 pinched by the spring 4. As seen from FIGS. 9A and 9B, the cam shaft 5 is rotatable and unremovable fitted over a cylindrical bearing tube 5a whose base section 5a' is rigidly secured to the main body 1. The cam shaft 5 has a protruding section 5b having an enlarged cross section and extending axially and outwardly from the bearing port 1c of the main body 1 in the X-direction that is parallel to the edge 1a of the main body so that it is received by a bearing section 2c formed in the corresponding knuckle-shaped end 2b of the swing member 2.

The cam shaft also has a cam section 5c. The spring 4 fitted over the bearing tube 5a is rigidly secured relative to the edge 1a and has a pair of resilient tips 4a, 4a resiliently abutting the cam section 5c. As seen from FIGS. 9A through 9D, the cam section 5c has a pair of narrowly separated flat surfaces 5d, 5d for providing a stationary state and a pair of outwardly rounded surfaces 5e, 5e for providing an easily rotatable state.

Thus, with the paired hinges 3A, 3B arranged in a manner as described above, as the swing member 2 is turned from the closed position in FIG. 12B to the open position indicated by phantom lines, the cam section 5c of the cam shaft 5 of each of the hinges turns relative to the spring 4 and the flat surfaces 5d, 5d are caught by the resilient tip 4a, 4a to hold the swing member 4 in the open position, or operating position P, so that the user can operates the telephone set. When the swing member 2 is turned back to the closed position indicated by solid lines, the resilient tips 4a, 4a abut the respective rounded surfaces 5e, 5e of the cam section 5c to hold the swing member 2 to the open position.

Therefore, the telephone set is held either to an operating state or to a resting state by the hinges in a manner as described above. However, the hinges of the known hinge unit require an assembling operation for bringing the protruding section 5b of the main body 1 into engagement with the bearing section 2c of the swing member 2 as shown in FIG. 9B. More specifically, the swing member 2 of the telephone set is made of synthetic resin to make it deformable so that the bearing sections 2c, 2c of the swing member 2 may be brought into engagement with the respective protruding sections 5b, 5b of the main body 1 by forcibly separating the knuckle-shaped opposite ends 2b, 2b from each other.

Thus, considerable force have to be applied to the swing member to assemble the known portable telephone set. Such an assembling operation is time consuming and requires a considerable work load.

FIGS. 10 through 11E illustrate the hinges 3C, 3D of an improved known hinge unit proposed to eliminate the above identified problem.

While the known hinges have a configuration basically same as that of the hinges of FIGS. 8A through 9D, they provide an improvement as discussed below.

Each of the hinges 3C, 3D of the hinge unit comprises a spring 6 and a cam shaft 7 pinched by the spring 6. As seen from FIGS. 11A through 11E, the cam shaft 5 is rotatable and unremovable housed in a rectangular sleeve 8 rigidly secured to the main body 1. Additionally, the cam shaft 7 has a protruding section 7a having an enlarged cross section and extending axially and outwardly from the bearing port 8a of the rectangular sleeve 8 in the X-direction that is parallel to the edge 1a of the main body so that it is received by a bearing section 2c formed in the corresponding knuckle-shaped end 2b of the swing member 2.

Reference symbol 7b in FIGS. 11B and 11D denotes an antirelease edge of the cam shaft 7 for preventing the cam shaft 7 from being released from the rectangular sleeve 8 to move away rightward in FIGS. 11B and 11D as it abuts the bottom wall of the rectangular sleeve 8 where the bearing port 8a is arranged.

The cam shaft also has a cam section 5c as seen from FIG. 11E. The cam section 7c has a pair of narrowly separated flat surfaces 7d, 7d for providing a standstill state and a pair of outwardly rounded surfaces 7e, 7e for providing an easily rotatable state as in the case of the first known hinge unit.

The cam section 7c is fitted over a small diameter section 6b of a cylindrical bearing tube 6a of the spring 6 so that the cam shaft 7 is rotatable relative to the small diameter section 6b. Thus, the remaining large diameter section 6c of the cylindrical bearing tube 6a and the cam section 7c are axially located side by side in the X-direction. Additionally, as seen from FIGS. 11A and 11B, the large diameter section 6c has low lateral projections 6d, 6d that are engagedly received by respective grooves 8b, 8b formed on the inner wall of the rectangular sleeve 8 such that the cylindrical bearing tube 6a of the spring 6 is axially slidable in the X-direction by a given distance.

Still additionally, the spring 6 has a spring section 6e rigidly fitted to the small diameter section 6c and a pair of resilient tips 6f, 6f extending from the spring section 6e toward the cam section 7c and adapted to resiliently abut the flat surfaces 7d, 7d for providing a stationary state or the outwardly rounded surfaces 7e, 7e for providing an easily rotatable state of the cam section 7c as in the case of the first known hinge unit.

A coil spring 9 is arranged between the inner end of the large diameter section 6c of the spring 6 and the end wall members 8c, 8c of the rectangular sleeve 8 arrange opposite to the end where the bearing port 8a is located so that the cam shaft 7 is constantly urged outwardly, or rightward in FIGS. 11B and 11D, by the coil spring 9 by way of the spring 6 and hence the antirelease edge 7b of the cam shaft 7 is constantly held in abutment with the corresponding end of the rectangular sleeve 8.

With this arrangement, when the protruding section 7a protruding from the bearing port 1c of the main body 1 to an extreme position as indicated by phantom lines in FIG. 11D is pushed back, or leftward in FIG. 11D, by applying pressure thereto, the applied pressure is transmitted to the coil spring 9 by way of the cam shaft 7 and the cylindrical bearing tube 6a to force the cylindrical bearing tube to move in the X-direction as it is guided by the grooves 8b, 8b of the rectangular sleeve 8 until the protruding section 7 is moved to the opposite extreme position indicated by solid lines, when the coil spring 9 is completely compressed.

Thus, if the extent to which the coil spring is compressed is properly selected, the operation of bringing the protruding section 7a of the cam shaft 7 into engagement with the bearing section 2c of the swing member 2 can be performed quickly and easily simply by pushing back the protruding section 7a by means of a finger tip and then quickly pushing the corresponding knuckle-shaped end 2b of the swing member 2 toward the main body. Therefore, the second known hinge unit provide a significant advantages over the first known hinge unit.

However, each of the hinges of the second known hinge unit still requires the use of not only a pair of resilient tips 6f, 6f for the spring 6 to be held in abutment with the cam section 7c of the cam shaft 7 in order to keep the swing member 2 open relative to the main body 1 by a given angle and also in the closed position but a coil spring 9 in order to allow the protruding section 7a of the cam shaft 7 to restore the original position when it is released after having been pushed into the rectangular sleeve 8.

Additionally, the cylindrical bearing tube 6a rigidly holding the resilient tips 6f, 6f is divided into a large diameter section 6c and a small diameter section 6b which has to be fitted into the cam shaft 7 from an end thereof until the large diameter section 6c abuts the cam shaft 7 and the end wall members 8c, 8c of the rectangular sleeve 8 have to be bent after the completion of the assembling operation because they have been left unbent for easy assembling. Thus, the process of manufacturing and assembling such a hinge device is rather complicated and cumbersome.

SUMMARY OF THE INVENTION

In view of the above identified problems of the second known hinge unit, it is therefore an object of the present invention to provide an improved hinge wherein, as the cam shaft is pushed into the rectangular sleeve, the spring that has been held in abutment with the cam section of the cam shaft to press the latter is made to ride over a tapered section connected to the cam shaft and move toward the large diameter end thereof.

If the pressure applied to the cam shaft is released under this condition, the cam section is slidingly moved back from the tapered section to the cam section by way of the small diameter end of the tapered section only by the resilient force of the spring so that the cam shaft may restore the original position and the swing member may be operated and held to either a stationary state or an easily rotatable state by the rotary motion of the cam shaft without requiring the use of a coil spring unlike the case of the second known hinge unit. Thus, a hinge according to the invention is structurally simple and reliable and allows the operation of assembling the main body and the swing member to be conducted easily and quickly.

Additionally, an antirelease hook section, a cam section, a tapered section and a protruding section may be sequentially and continuously arranged to form the cam shaft and the spring including resilient tips may be formed as part of the rectangular sleeve such that the antirelease hook section extends outwardly through the opening of the inner end of the rectangular sleeve and the tapered section of the cam shaft is at the bearing port arranged at the outer end of the rectangular sleeve. With this arrangement, the resilient tips can be formed as part of the rectangular sleeve, which can effectively be utilized as bearing for the cam shaft.

Thus, according to a first aspect of the invention the above object is achieved by providing a hinge unit having a pair of hinges for linking a main body and a swing member at the knuckle-shaped respective opposite ends of an edge of the latter to make it swingable relative to the main body around the edge, each of said hinges comprising a spring and a cam shaft pinched by the spring and fitted to either the main body or the swing member so as to be rotatable along an axis running in parallel with said edge and axially displaceable by a given distance from an unreleaseable position, said cam shaft including a cam section, a tapered section extending between a small diameter end and a large diameter end and a projecting section arranged axially, sequentially and continuously, said spring being also fitted to the main body or the swing member, whichever is appropriate, to resiliently pinch tip-holding areas of the cam section of the cam shaft at a selected angular position by means of a pair of resilient tips of the spring, said resilient tips being adapted to be slidingly moved toward the large diameter end of the tapered section by pushing the protruding section releasably engaged with a bearing section of the swing member or the main body, whichever is appropriate, said cam shaft being adapted to restore said unreleaseable position by the resilient force of said resilient tips.

According to a second aspect of the invention, there is provided a hinge unit having a pair of hinges for linking a main body and a swing member at the knuckle-shaped respective opposite ends of an edge of the latter to make it swingable relative to the main body around the edge, each of said hinges comprising a spring and a cam shaft pinched by the spring and fitted to either the main body or the swing member so as to be rotatable along an axis running in parallel with said edge and axially displaceable by a given distance from an unreleaseable position, said cam shaft including a cam section, a tapered section extending between a small diameter end and a large diameter end and a projecting section arranged axially, sequentially and continuously, said spring being also fitted to the main body or the swing member, is appropriate, to resiliently pinch tip-holding areas of the cam section of the cam shaft at a selected angular position by means of a pair of resilient tips of the spring, said resilient tips being adapted to be slidingly moved toward the large diameter end of the tapered section by pushing the protruding section releasably engaged with a bearing section of he swing member or the main body, whichever is appropriate, said cam shaft being adapted to restore said unreleaseable position by the resilient force of said resilient tips, said cam section of the camshaft having the tip-holding areas for holding the resilient tips and rounded surfaces arranged circumferentially and connected to said tip-holding areas to receive the resilient force of said resilient tips.

BRIEF DESCRIPTION OF THE DRAWINGS

FIG. 9A is a schematic front view of one of the hinges of the hinge unit of FIG. 8A.

FIG. 9B is a schematic cross sectional plan view of the hinge of FIG. 9A, illustrating how the main body and the swing member are linked.

FIG. 9C is a schematic rear view of the hinge of FIG. 9A.

FIG. 9D is a schematic cross sectional view of the hinge of FIG. 9B taken along line D—D in FIG. 9B.

FIG. 11A is a schematic front view of one of the hinges of the hinge unit of FIG. 10.

FIG. 11B is a schematic cross sectional plan view of the hinge of FIG. 11A, illustrating how the main body and the swing member are linked.

FIG. 11C is a schematic rear view of the hinge of FIG. 11A.

FIG. 11D is a schematic cross sectional view of the hinge of FIG. 11B taken along line D—D in FIG. 11B.

DESCRIPTION OF THE PREFERRED EMBODIMENTS

Figure 1A:
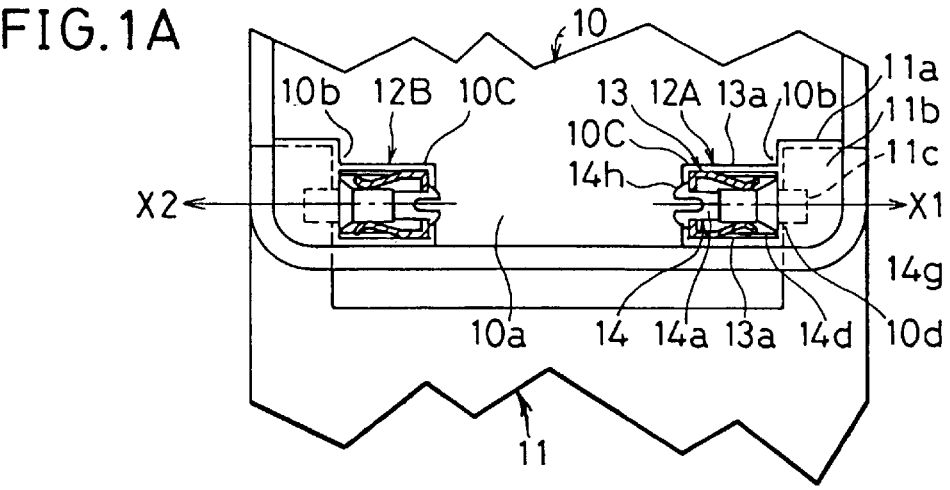
FIG. 1A is a partially cut-away schematic plan view of an embodiment of hinge unit according to the invention.
Figure 1B:
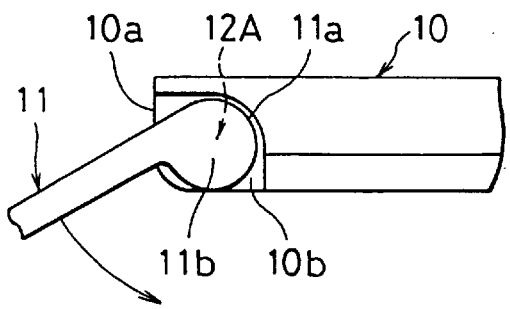
FIG. 1B is a schematic lateral view of the hinge unit of FIG. 1A.

Now, the present invention will be described by referring to the accompanying illustrating preferred embodiments thereof applied to a portable telephone set. FIG. 1A is a partially cut-away schematic plan view of a first embodiment of hinge unit according to the invention and FIG. 1B is a schematic lateral view of the hinge unit of FIG. 1A. Referring to FIGS. 1A and 1B, the main body 10 is linked to the swing member 11 at the opposite ends 10b, 10b of an edge 10a thereof by way of the respective hinges 12A, 12B of the hinge unit arranged at the knuckle-shaped corresponding opposite ends 11b, 11b of a lateral edge 11a thereof. Each of the hinges 12A, 12B comprises a spring and a cam shaft 14 pinched by the spring 13.

The cam shaft 14 is fitted either to the main body 10 as illustrated or to the swing member 11 to be linked to it and so arranged that it is axially and outwardly movable by a given distance from an unreleaseable end position in the sense of X1 direction or X2 direction of the axis, whichever is appropriate, and rotatable around the axis.

Figure 1C:
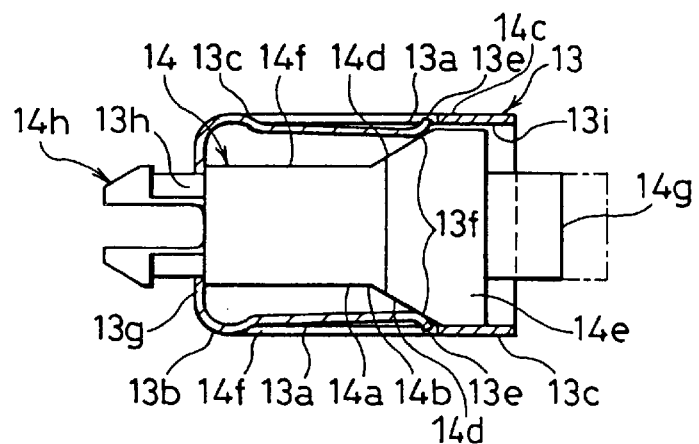
FIG. 1C is a schematic cross sectional plan view of one of the hinges of the hinge unit of FIG. 1A, where the cam shaft is forcibly pushed into the sleeve.
Figure 1D:
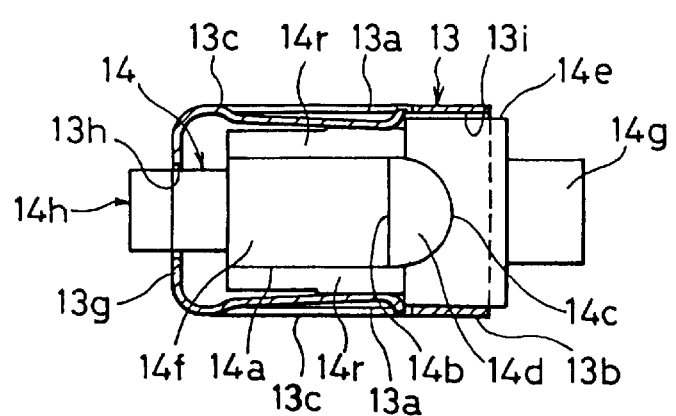
FIG. 1D is a schematic cross sectional plan view of one of the hinges of the hinge unit similar to FIG. 1C but showing the cam shaft restored to the normal position.

As seen from FIGS. 1C and 1D, the cam shaft 14 includes a cam section 14a and a tapered section 14d axially connected to it and extending from a small diameter end 14b to a large diameter end 14c. In the case of the illustrated embodiment, a large diameter section 14e is extended from the large diameter end 14c of the tapered section 14d.

On the other hand, the spring 13 is rigidly secured to the inside of an appropriate frame member 10c of the main body 10 or the swing member 11, whichever is appropriate, as shown in FIG. 1A.

In the illustrated embodiment, the cam section 14a of the cam shaft 14 has a pair of tip-holding areas adapted to be pinched by a pair of resilient tips 13a, 13a of the spring 13 when the cam shaft 14 is in a particular angular position. Note that the tapered section 14d has opposite surface areas extending from the respective tip-holding areas 14f, 14f.

It will be appreciated by referring to FIG. 7 showing another embodiment of the invention that this second embodiment comprises only one resilient tip 13a adapted to resiliently abut a corresponding tip-holding area 14f to simplify the configuration.

The cam shaft 14 includes a protruding section 14g axially extending from the tapered section 14d and through a bearing port 10d of the main body 10 (see FIGS. 1A and 4) in the sense of X1 direction or X2 direction of the axis, whichever is appropriate, and engagedly received by a bearing section arranged on the swing member 11 or the main body 10, whichever is appropriate so that any rotary force may be transmitted from one to the other. In the illustrated embodiment, the protruding section 14g is realized in the form of a rectangular bar (see FIG. 3C) and the bearing section 11c has a matching rectangular opening.

The relationship of the cam shaft 14 and the spring 13 is such that, as the protruding section 14g is pushed leftward in FIG. 1C from the normal position indicated by phantom lines, the resilient tips 13a, 13a of the spring 13 is slidingly moved from the cam section 14a of the cam shaft 14 to the small diameter end 14b of the tapered section 14d and then made to ride over the tapered section 14d toward the large diameter end 14c thereof.

Figure 7A:
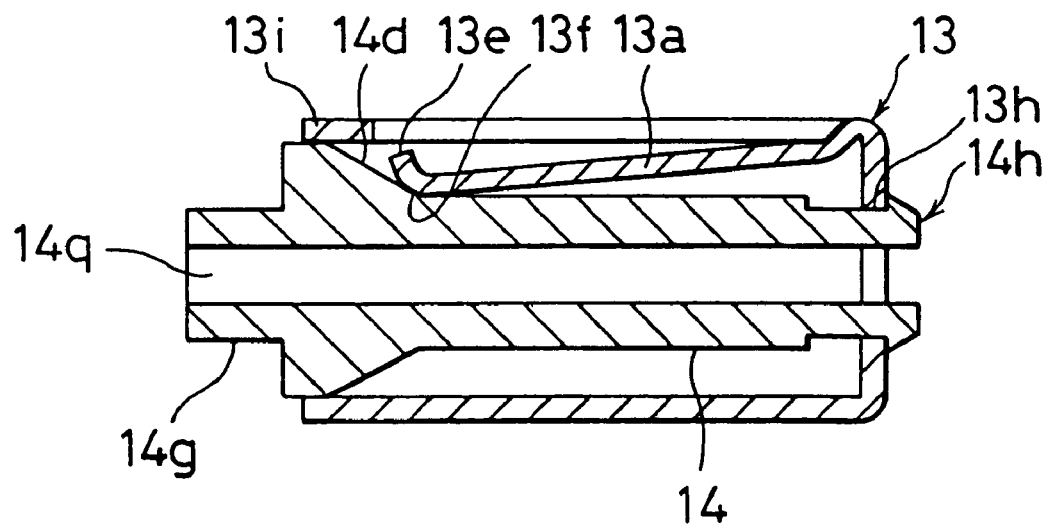
FIG. 7A is a schematic cross sectional plan view of one of the hinges of another embodiment of hinge unit according to the invention.
Figure 7B:
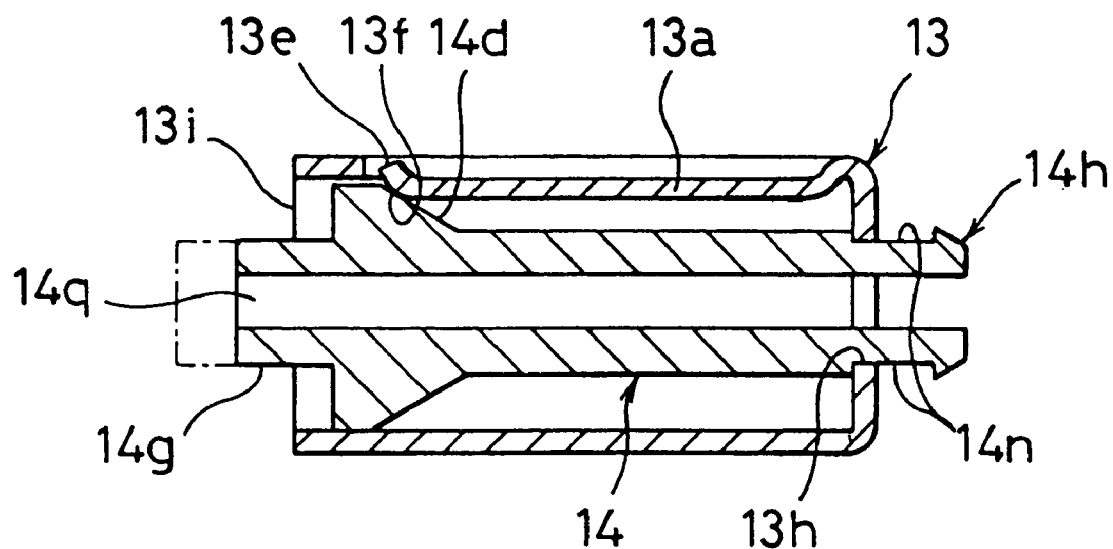
FIG. 7B is a schematic cross sectional view similar to FIG. 7A but showing the cam shaft pushed into the sleeve.
Figure 8A:
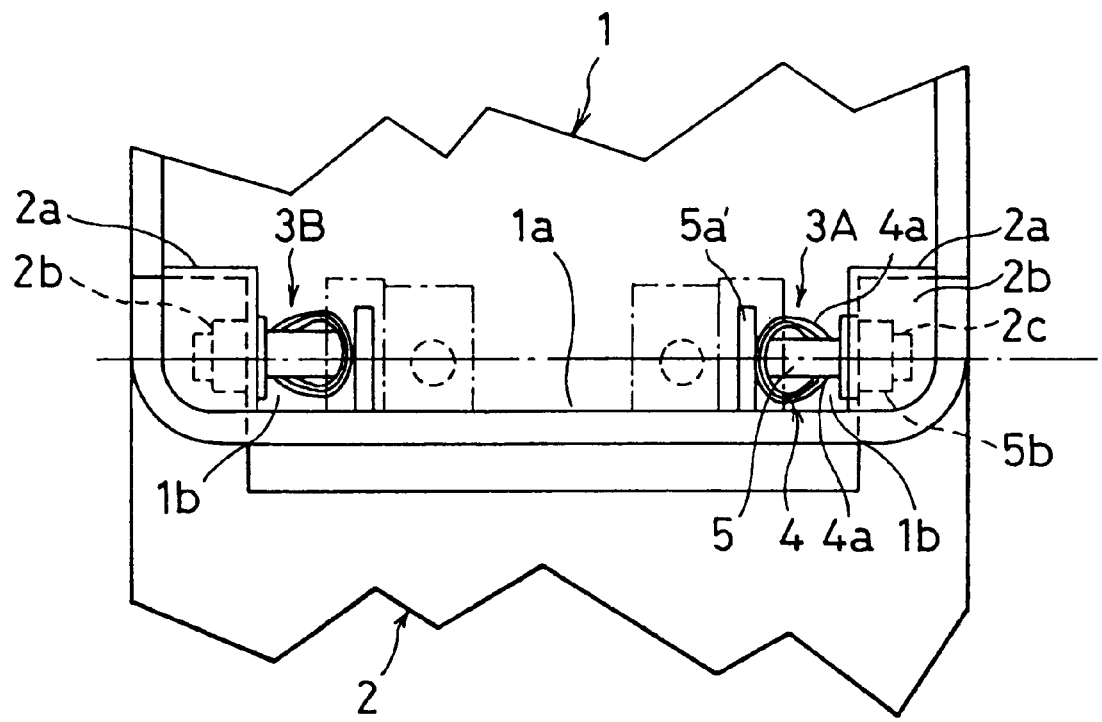
FIG. 8A is a partially cut-away schematic plan view of a known hinge unit.
Figure 8B:
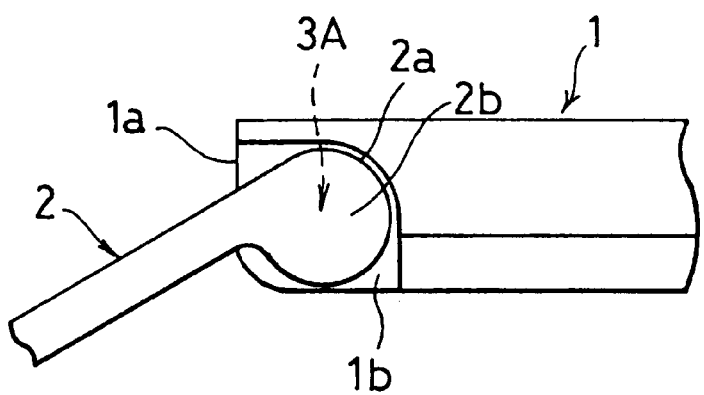
FIG. 8B is a schematic lateral view of the hinge unit of FIG. 8A.
Figure 10:
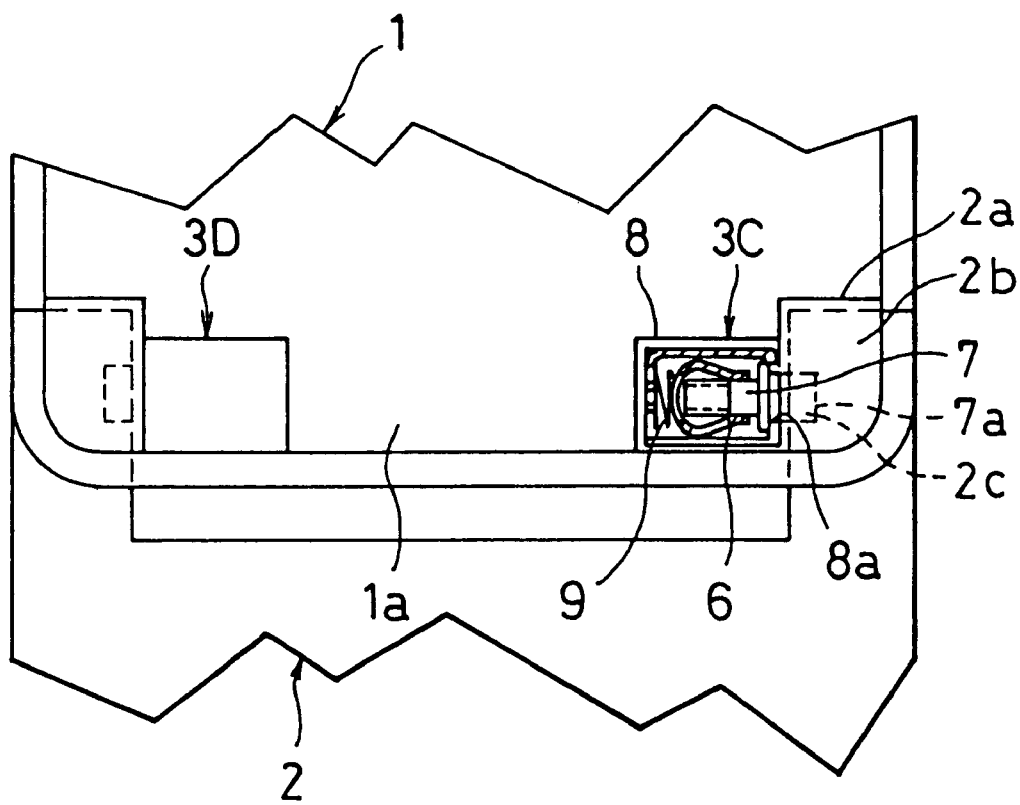
FIG. 10 is a partly cut-away schematic plan view of another known hinge unit obtained improving that of FIG. 8A.
Figure 12A:
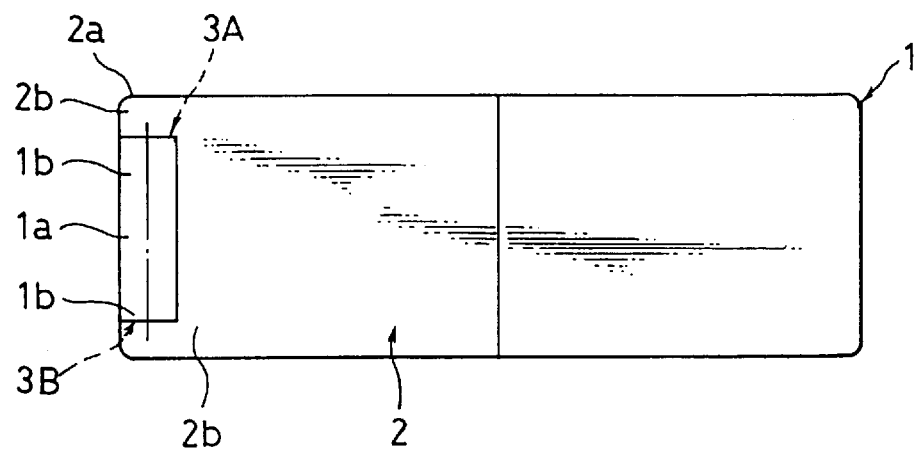
FIG. 12A is a schematic plan view of a portable telephone set using a known hinge unit.
Figure 12B:
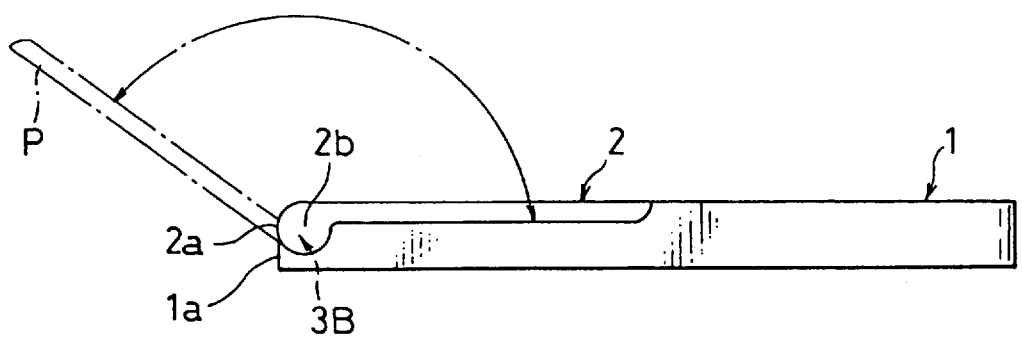
FIG. 12B is a schematic lateral view of the portable telephone set of FIG. 12A.

Thus, if a pair of resilient tips are used, the paired resilient tips 13a, 13a are increasingly separated from each other to accumulate resilient force. If, on the other hand, only a single resilient tip is used, the resilient tip 13a is moved away from the axial line to also accumulate resilient force. As a result, the protruding section 14g can be easily brought into engagement with the bearing section 11c of the swing member 11. When the protruding section 14g is released from the pressure applied to it, the cam shaft 14 is urged to move leftward in FIG. 1C or rightward in FIG. 7B by the accumulated resilient force of the resilient tip 13a or the resilient tips 13a, 13a, whichever is appropriate, and quickly restore the normal position as shown in FIG. 1D or FIG. 7A, where the swing member 11 is pivotably linked to the main body 10.

A hinge unit according to the second aspect of the invention has a configuration basically same as that of a hinge unit according to the first aspect of the invention. However, as shown in FIG. 3B, the cam shaft 14 includes an antirelease hook section 14h, a peripherally arranged cam section 14a, a tapered section 14d extending from a small diameter end 14b to a large diameter end 14c and a protruding section 14g to be held in releaseable engagement with the bearing section 14c of the swing member 11 of the main body 10, whichever is appropriate, to transmit rotary force, said antirelease hook section 14a, said cam section 14a, said tapered section 14d and said protruding section 14g being arranged sequentially and continuously along the axis of the cam shaft 14.

Figure 3A:
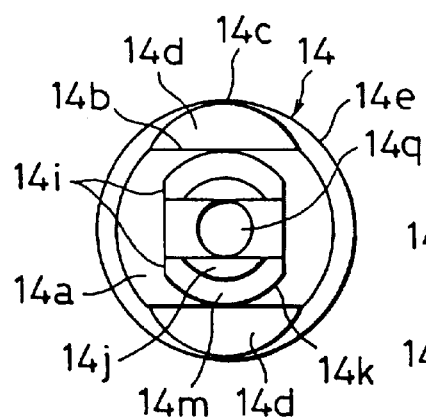
FIG. 3A is a schematic lateral view of the cam shaft of the hinge of FIG. 1C.
Figure 3B:
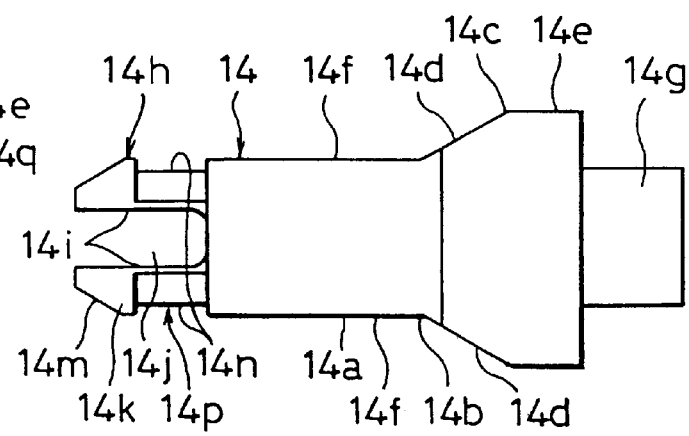
FIG. 3B is a schematic plan view of the cam shaft of FIG. 3A.
Figure 3C:
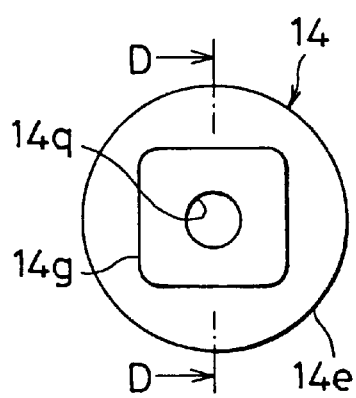
FIG. 3C is a schematic lateral view of the cam shaft of FIG. 3A as viewed from the opposite side.
Figure 3D:
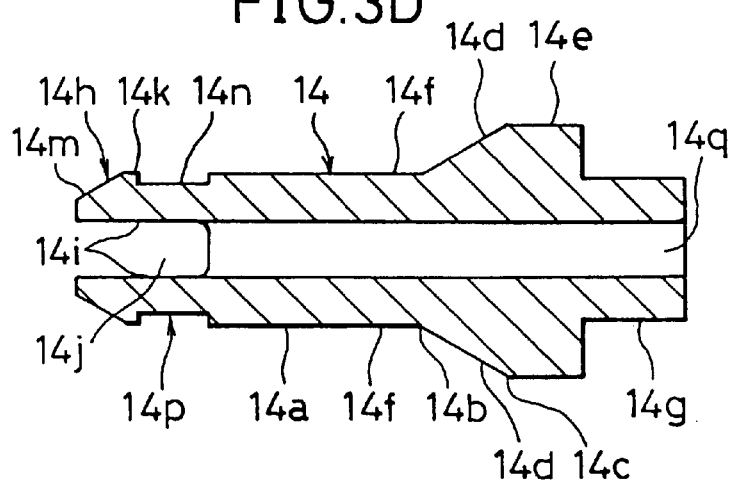
FIG. 3D is a schematic cross sectional view of the cam shaft taken along line D—D in FIG. 3C.
Figure 3E:
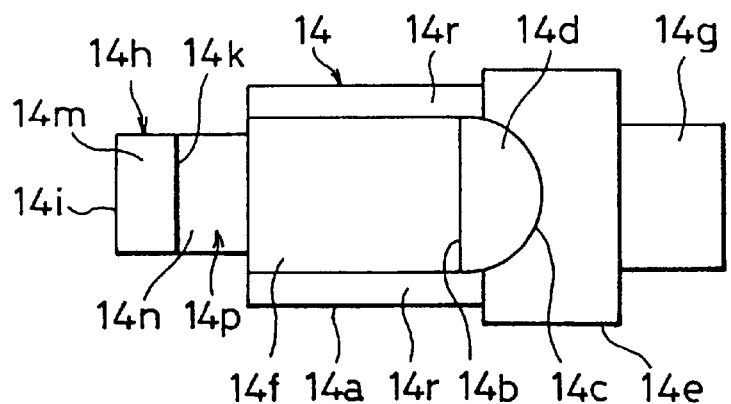
FIG. 3E is a schematic plan view of the cam shaft of FIG. 3A placed at a different angular position.

As shown in FIGS. 3A and 3B, the antirelease hook section 14h has a pair of resilient antirelease projections 14i, 14i projecting axially with a void section interposed therebetween and having respective radially standing curved hooks 14k, 14k to respectively define tapered surface areas 14m, 14m and intermediate curved base sections 14n, 14n, which curved base sections 14n, 14n forming a neck 14p as will be described hereinafter. Referring to FIGS. 3A, 3C and 3D, reference symbol 14q denotes the axial through hole of the cam shaft 14 through which normally a lead wire is introduced.

Figure 2A:
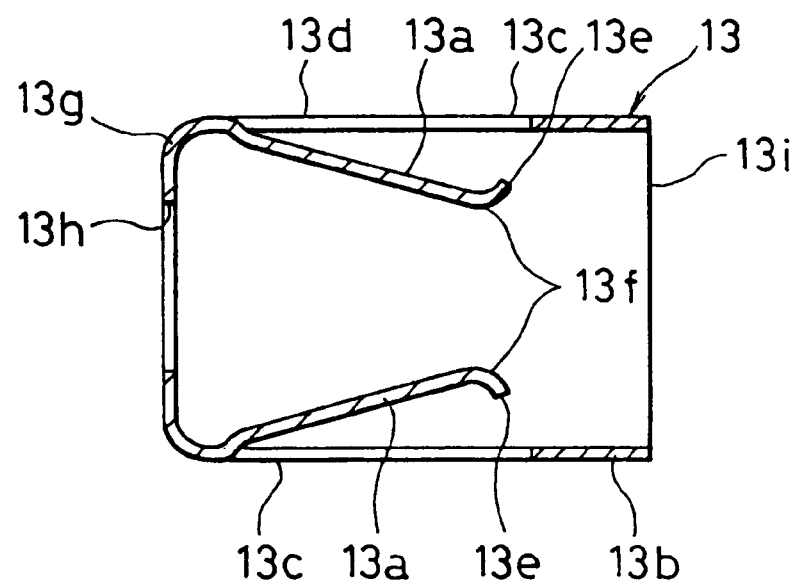
FIG. 2A is a schematic cross sectional plan view of the spring of the hinge of FIG. 1C.
Figure 2B:
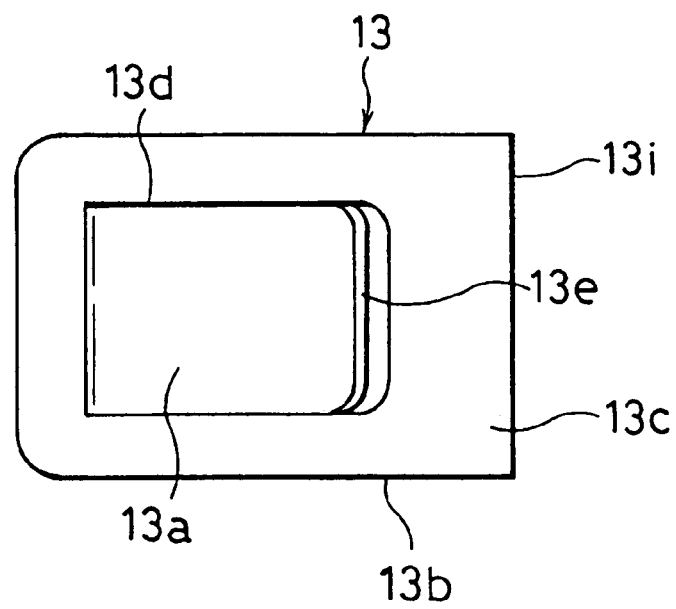
FIG. 2B is a schematic plan view of the spring of FIG. 2A.

Now, the spring 13 will be described by referring to FIGS. 2A and 2B. It comprises a rectangular sleeve 13b rigidly secured to the main body 10 or the swing member 11, whichever is appropriate, by means of said frame member 10c and a pair of U-shaped resilient tips 13a, 13a formed by cutting oppositely disposed axial walls 13c, 13c of the rectangular sleeve 13b and inwardly bending the U-shaped portions so that the front ends 13e, 13c of the resilient tips 13a, 13a are made to approach each other and directed toward the protruding section 14g. However, as described earlier by referring to FIGS. 7A and 7B, the paired resilient tips 13a, 13a may be replaced by a single resilient tip 13a.

Referring back to FIGS. 2A and 2B, the front ends 13e, 13e of the resilient tips 13a, 13a are bent back and directed to the respective walls 13c, 13c to produce curved sliding surface areas 13f, 13f adapted to slide smoothly on the cam section 14a and the respective surface areas of the tapered section 14d.

The rectangular sleeve 13b is additionally provided at the inner end wall 13g thereof with an opening 13h and at the opposite end with a bearing port 13i. Thus, as the cam shaft 14 is moved into the rectangular sleeve 13b through the bearing port 13i with the antirelease hook section 14h leading the movement and the tapered surface areas 14m, 14m of the resilient antirelease projections 14i, 14i of the antirelease hook section 14h pass through the front opening 13h of the rectangular sleeve 13b, the resilient antirelease projections 14i, 14i are inwardly bent by the peripheral edge of the front opening 13h and the neck 14p becomes engaged with the peripheral edge of the front opening 13h as seen from FIGS. 1C, 1D and 4.

Figure 4:
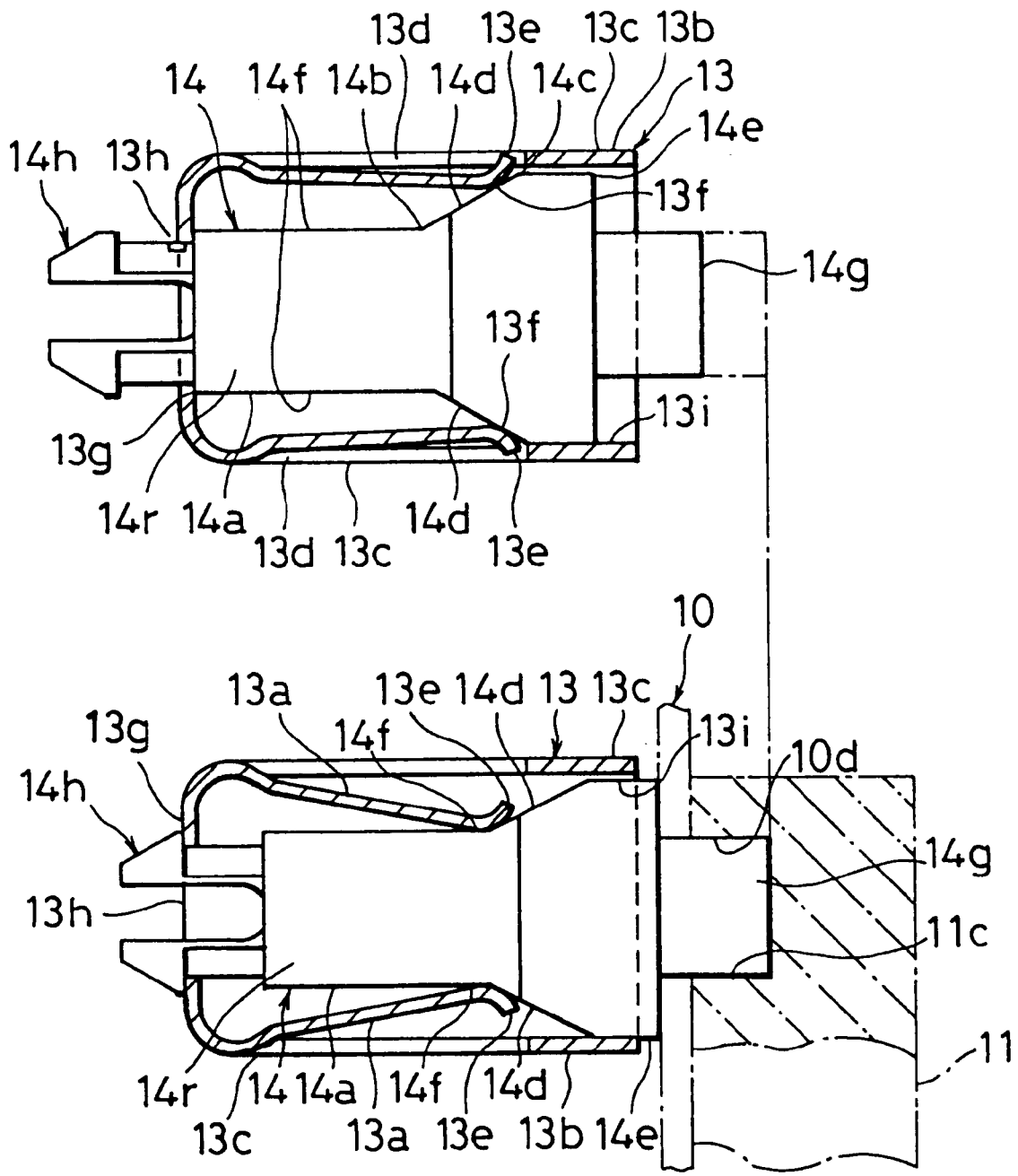
FIG. 4 is a schematic cross sectional plan view of the hinge of FIG. 1C, showing how the main body and the swing member are linked.

Then, as shown in FIG. 4, the radially standing curved hooks 14k, 14k come into engagement with the inner end wall 13g to make the cam shaft rightward unreleaseable in FIG. 4. Note that the curved sliding surface areas 13f, 13f of the resilient tips 13a, 13a are resiliently abutting the cam section 14a under this condition.

In the above unreleaseable condition, the large diameter section 14e extending from the tapered section 14d is received by the bearing port 13i of the rectangular sleeve 13b.

Thus, as the protruding section 14g of the cam shaft 14 is pushed into the rectangular sleeve further as described above, the resilient tips 13a, 13a of the rectangular sleeve 13 are slidingly moved from the cam section 13a toward the large diameter end 14c of the tapered section 14d by way of the small diameter end 14b. Once the pressure for inwardly urging the protruding section 14g is released, the cam shaft 14 is pushed back by the resilient force of the resilient tips 13a, 13a to a position where the radially standing curved hooks 14k, 14k of the antirelease hook section 14h come into engagement with the peripheral edge of the opening 13h of the front end wall 13g. This provides an improvement relative to the arrangement according to the first aspect of the invention as described earlier.

According to the second aspect of the invention, the swing member 11 can be linked to the main body 10, or vice versa, easily and quickly simply by axially moving the cam shaft 14.

Figure 5A:
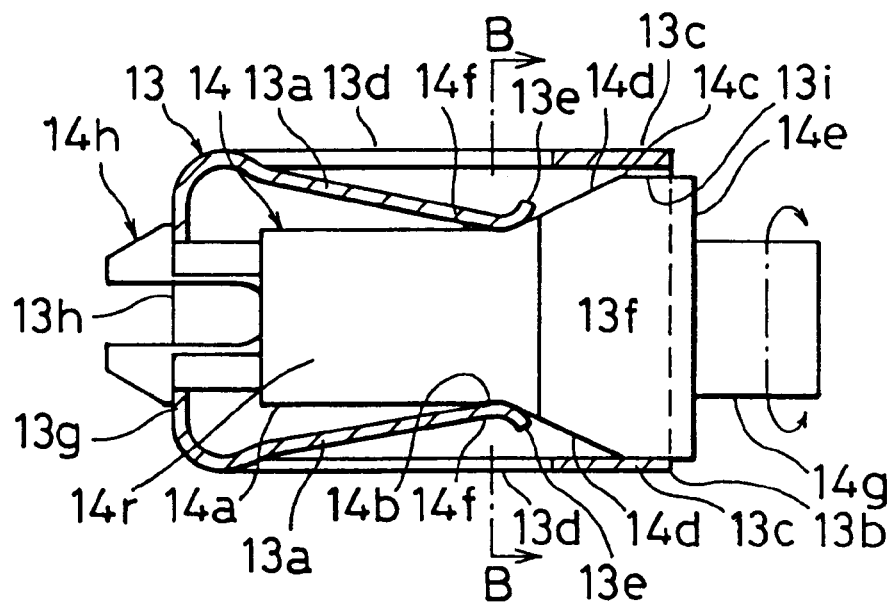
FIG. 5A is a schematic cross sectional plan view of the hinge of FIG. 1C in a state where the swing member is opened.
Figure 5B:
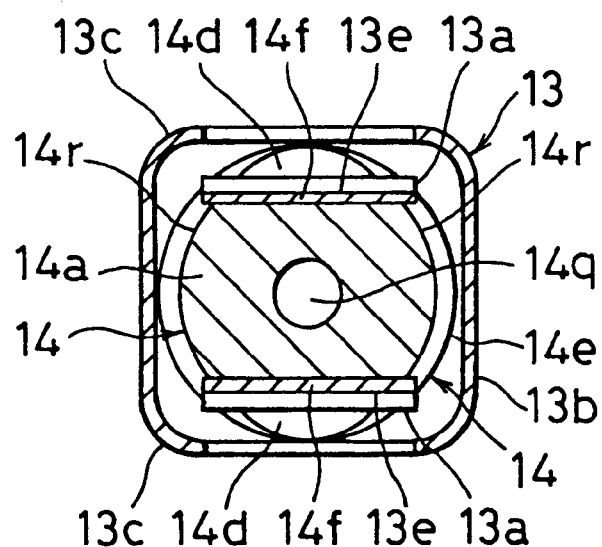
FIG. 5B is a schematic cross sectional view of the hinge of FIG. 5A taking along line B—B in FIG. 5A.

Additionally, the cam shaft 14 can be resiliently held by the resilient tip 13a or tips 13a, 13a of the spring 13 at the tip-holding area 14f or areas 14f, 14f, whichever is appropriate, of the cam section 14a as shown in FIG. 5A. Still additionally, the cam shaft 14 is also provided with rounded surfaces 14r, 14r that are circumferentially connected to the tip-holding areas 14f, 14f and subjected to the resilient force of the resilient tips 13a, 13a as shown in FIGS. 6A and 6B.

Figure 6A:
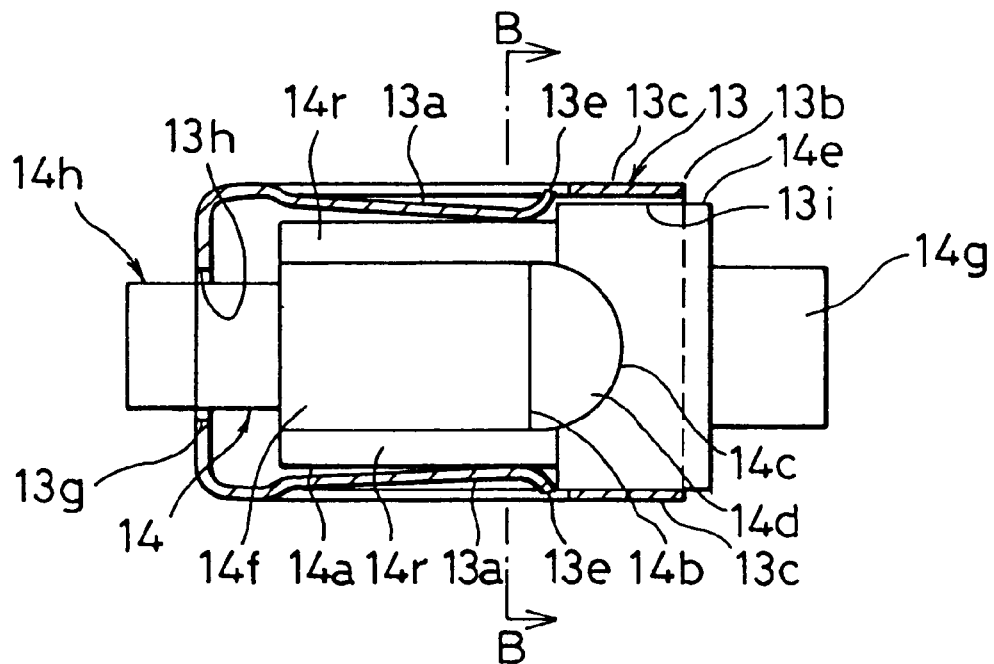
FIG. 6A is a schematic cross sectional plan view of the hinge of FIG. 1C in a state where the swing member is closed.
Figure 6B:
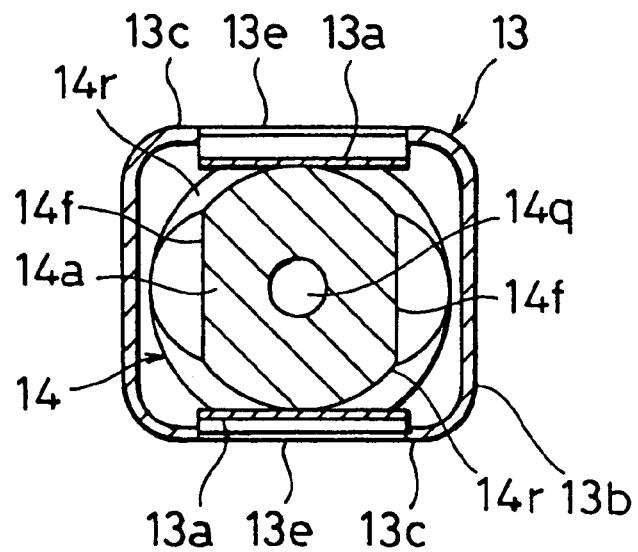
FIG. 6B is a schematic cross sectional view of the hinge of FIG. 6A taking along line B—B in FIG. 6A.

Thus, when the resilient tips 13a, 13a are made to abut the rounded surfaces 14r, 14r as shown in FIGS. 6A, 6B, the swing member 11 is held to a closed position relative to the main body 10. When, on the other hand, the swing member 11 is opened by a given angle relative to the main body 10, the resilient tips 13a, 13a pinch the cam shaft 14 at the tip-holding areas 14f, 14f to keep the swing member 11 to the open position.

ADVANTAGES OF THE INVENTION

As described above in detail, with a hinge unit according to the first aspect of the invention, the swing member can be held to an open position relative to the main body where the swing member shows a given angle relative to the main body as in the case of known hinge units and the swing member can be linked to the main body easily and quickly during the assembling operation. What is remarkable with a hinge unit according to the invention lies in that it does not require a coil spring as in the case of the above described known hinge unit where the cam shaft pushed into a spring has to be moved back by means of the resilient force of a coil spring in order to restore the rotatable position of the cam shaft. Instead, a hinge unit according to the first aspect of the invention is provided with a tapered section so that a single spring can operates also as the coil spring to simplify the overall configuration of the hinge unit and make the hinge unit compact, light-weight and hence less costly, although the main body and the swing member can be linked together with an enhanced degree of easiness and quickness.

In a hinge unit according to the invention, the cam shaft additionally comprises an antirelease hook section and the resilient tips are formed by cutting the spring and made to slidingly abut the tip-holding areas or the rounded surfaces of the cam section of the cam shaft to provide the hinge unit with an increased reliability of operation as compared with a hinge unit according to the first aspect of the invention.

We claim:

1. A hinge unit having a pair of hinges for linking a main body and a swing member at knuckle-shaped respective opposite ends of an edge of the swing member to make the swing member swingable relative to the main body around the edge, each of said hinges comprising a spring, and a cam shaft pinched by the spring and adapted to be fitted to one of the main body and the swing member so as to be rotatable about an axis parallel with said edge and axially displaceable from an original position, said cam shaft including a cam section, a tapered section extending between a small diameter end and a large diameter end and a projecting section arranged axially, sequentially and continuously, said spring being adapted to be fitted to the other one of the main body and the swing member, to resiliently pinch tip-holding areas of the cam section of the cam shaft at a selected angular position by means of a pair of resilient tips of the spring, said resilient tips being adapted to be slidingly moved toward the large diameter end of the tapered section by pushing the protruding section releasably engaged by a bearing section of one of the swing member and the main body, said cam shaft being adapted to restore said original position by the resilient force of said resilient tips of the spring.

2. A hinge unit having a pair of hinges for linking a main body and a swing member at knuckle-shaped respective opposite ends of an edge of the swing member to make the swing member swingable relative to the main body around the edge, each of said hinges comprising a spring, and a cam shaft pinched by the spring and adapted to be fitted to one of the main body and the swing member so as to be rotatable about an axis parallel with said edge and axially displaceable from an original position, said cam shaft including a cam section, a tapered section extending between a small diameter end and a large diameter end and a projecting section arranged axially, sequentially and continuously, said spring being adapted to be fitted to the other one of the main body and the swing member, to resiliently pinch tip-holding areas of the cam section of the cam shaft at a selected angular position by means of a pair of resilient tips of the spring, said resilient tips being adapted to be slidingly moved toward the large diameter end of the tapered section by pushing the protruding section releasably engaged by a bearing section of one of the swing member and the main body, said cam shaft being adapted to restore said original position by the resilient force of said resilient tips of the spring, said cam section of the cam shaft having the tip-holding areas for holding the resilient tips and rounded surfaces arranged circumferentially and connected to said tip-holding areas to receive the resilient force of said resilient tips.

\* \* \* \* \*